United States Patent
Komai

(10) Patent No.: US 7,446,975 B2
(45) Date of Patent: Nov. 4, 2008

(54) SERVO WRITER

(75) Inventor: Hirokazu Komai, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 642 days.

(21) Appl. No.: 11/132,398

(22) Filed: May 19, 2005

(65) Prior Publication Data

US 2005/0259359 A1  Nov. 24, 2005

(30) Foreign Application Priority Data

May 19, 2004 (JP) .............................. 2004-148811

(51) Int. Cl.
*G11B 15/00* (2006.01)
(52) U.S. Cl. ................................. 360/130.21
(58) Field of Classification Search ............ 360/130.21, 360/130.33; 242/346
See application file for complete search history.

(56) References Cited

U.S. PATENT DOCUMENTS

| | | | |
|---|---|---|---|
| 5,414,585 A | 5/1995 | Saliba | |
| 5,447,279 A | 9/1995 | Janssen et al. | |
| 5,519,562 A | 5/1996 | Argumedo et al. | |
| 5,646,806 A * | 7/1997 | Griffith et al. | 360/130.22 |
| 6,118,630 A * | 9/2000 | Argumedo | 360/130.21 |
| 6,353,514 B1 | 3/2002 | Rambosek et al. | |

FOREIGN PATENT DOCUMENTS

GB  2134691 A  8/1984
JP  2001-93211 A  4/2001

OTHER PUBLICATIONS

Patent Abstracts of Japan, vol. 2003, No. 11, Nov. 5, 2003 & JP 2003 196811 A (Fuji Photo Film Co Ltd), Jul. 11, 2003 *abstract*.

* cited by examiner

*Primary Examiner*—Allen T Cao
(74) *Attorney, Agent, or Firm*—Sughrue Mion, PLLC

(57) ABSTRACT

In a servo writer for recording a servo signal on a running tape is provided, a guide member provided near a head, and the guide member includes a surface guide provided to guide a surface of the running tape and an edge guide including a plurality of contact portions to guide an edge of the running tape. Among distances between adjacent contact portions of the plurality of contact portions of the first edge guide, at least one distance is different from another distance.

17 Claims, 9 Drawing Sheets

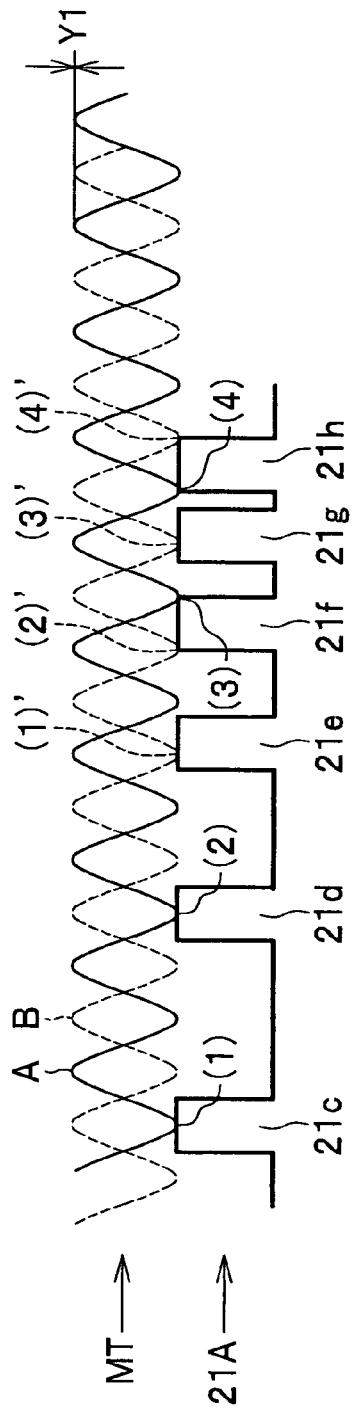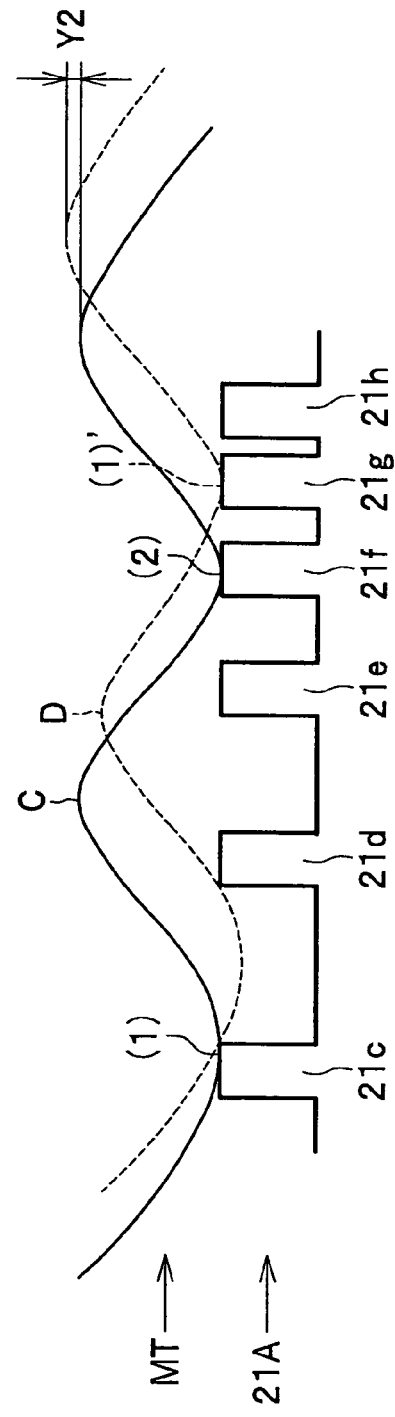

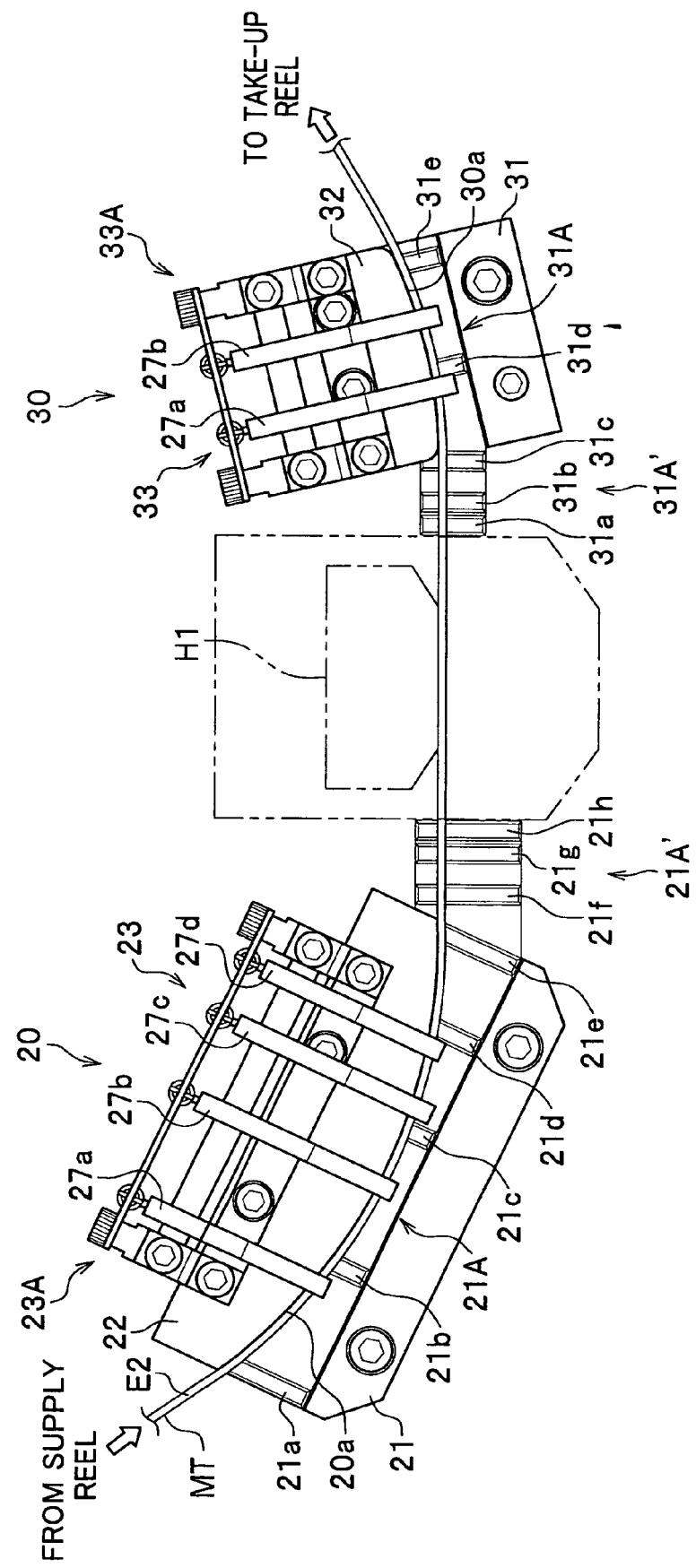

SERVO WRITER

CROSS-REFERENCE TO RELATED APPLICATIONS

This application claims the foreign priority benefit under Title 35, United States Code, § 119(a)-(d), of Japanese Patent Application No. 2004-148811, filed on May 19, 2004 in the Japan Patent Office, the disclosure of which is herein incorporated by reference in its entirety.

BACKGROUND OF THE INVENTION

1. Field of the Invention

The present invention relates to a servo writer having a tape-like recording medium such as a magnetic tape, and a head for recording or reproducing servo signals on or from this tape-like recording medium.

2. Description of the Related Art

Recently, a magnetic tape to be used for data backup of a computer is improved in linear density by increasing the number of data tracks, and to accurately read data recorded at high density, servo signals are recorded on a plurality of servo bands adjacent to the data tracks and these signals are reproduced.

In such a magnetic tape system using servo signals, it is required that servo signals are accurately written (recorded) on the magnetic tape, and as a device for this, a servo writer is used.

In such a technical field, it is also proposed that a fixed structure is used for the servo write head side, the magnetic tape side is structured to be adjustable in position, and the magnetic tape side is adjusted in position, whereby servo signals are recorded on predetermined positions (for example, see JP 2001-93211 A, paragraphs 0009-0011, FIG. 1).

In the above-mentioned servo writer, to accurately position the servo signal writing position, the head position and the running position of the magnetic tape are accurately set. On the other hand, as a method for stabilizing running of the magnetic tape, there is a generally known technique in that comparatively long flat surfaces are formed on the guide members by the side of the head, and the magnetic tape is made to run while the edges of the magnetic tape are slid on the flat surfaces.

However, the magnetic tape improved in linear density tends to become thinner in thickness, and in the constitution as described above in that the edges of the magnetic tape are slid, the sliding resistance may vary the running speed of the magnetic tape.

In addition, the magnetic tape itself may have dimensional variation of several microns in the width direction generated in the manufacturing process, and in many cases, this variation has a constant cycle C1 across the entire length of the magnetic tape MT (see FIG. 9), and this cycle C1 differs among pancakes. Therefore, if the pitch of the members that guide running by contact with the edges of the magnetic tape MT becomes equal to the cycle C1 or an integral multiple thereof, fluctuations in the tape width direction according to this cycle C1 are caused when the magnetic tape MT runs.

In view of the circumstances, it would be desirable to provide a servo writer which does not cause variation in running speed of a magnetic tape or the like, and in addition, can restrain fluctuations of the magnetic tape in the tape width direction, and can accurately record or reproduce servo signals.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

In one aspect of the present invention, a servo writer for recording a servo signal on a running tape, comprises: a head; and a guide member provided near the head, the guide member comprising a surface guide provided to guide a surface of the running tape and a first edge guide including a plurality of contact portions to guide a first edge (one of the edges) of the running tape, wherein among distances between adjacent contact portions of the plurality of contact portions of the first edge guide, at least one distance is different from another distance. The above head may include at least one of a write head and a read head. The read head may be a verify head.

In one embodiment of this configuration, the distances (intervals) may be at least partially uneven in the running direction of the tape. On the first edge guide of the guide member, a plurality of contact portions the intervals (distances) of which are at least partially uneven are disposed in the running direction of the tape, so that the tape runs while the first edge of the tape is guided by the plurality of contact portions. Therefore, the sliding areas between the first edge guides and the edges of the tape can be reduced, whereby the cause of wearing and uneven running speed when the tape runs can be reduced. Thereby, highly stable tape running can be realized.

In addition, the intervals of the contact portions of the first edge guides are made at least partially uneven, so that the tape is guided by the contact portions disposed at uneven intervals. Namely, tape inherent fluctuations in the tape width direction occurring when the tape runs are restrained by guidance by some of the contact portions. Thereby, highly stable tape running can be realized without a resonance phenomenon with respect to the tape inherent fluctuations.

Therefore, a servo writer which records or reproduces servo signals with a high degree of accuracy is obtained.

In the servo writer as defined above, preferably but not necessarily, among the distances between adjacent contact portions of the plurality of contact portions of the first edge guide, all distances may be different from one another. In one embodiment of this configuration, the distances (intervals) between the plurality of contact portions are all uneven, and thus a servo writer which can cope with different cycle fluctuations can be obtained. In such a servo wrier, resonance phenomenon and the like with respect to the tape inherent fluctuations are restrained more, whereby realizing more stable tape running. Therefore, a servo writer which can record or reproduce servo signals with a high degree of accuracy can be obtained.

In the servo writer as defined above, preferably but not necessarily, among pairs of adjacent contact portions of the plurality of contact portions of the first edge guide, a pair located nearer to the head than other pairs may be separated with a shorter distance put between adjacent contact portions thereof than the other pairs. In one embodiment of this configuration, the first edge guides are constituted so that the intervals (distances) of the contact portions adjacent to each other become smaller toward the head. Therefore, in such a servo writer, tape inherent fluctuations are more easily restrained toward the head, whereby a servo writer which can more accurately record or reproduce servo signals is obtained.

In the servo writer as described above, the plurality of contact portions of the first edge guide may preferably but not necessarily be each shaped like a strip laid substantially perpendicular to the surface of the running tape. In one embodiment of this configuration, the contact portions are formed as strips, and preferably, the strips are provided in the direction crossing the tape running direction at right angles. In such a servo writer, the edges of the tape running and the contact portions are always in contact so as to cross at right angles, and this provides a running state more stable than in the case where the tape edges and the contact portions are in contact with each other while inclining from the directions crossing at right angles. Therefore, a servo writer which can record and reproduce servo signals with a higher degree of accuracy is obtained.

In the servo writer as described above, the guide member may preferably but not necessarily further comprise a second edge guide including a plurality of contact portions to guide a second edge of the running tape. The second edge guide may preferably but not necessarily have any one or more of the same features as those of the first edge guide. In one embodiment of this configuration, the edge guides are provided on both side edges of the tape. In such a servo writer, tape inherent fluctuations are compositely restrained by the edge guides provided on both side edges of the tape, so that a servo writer which can more accurately record or reproduce servo signals is obtained.

Moreover, the plurality of contact portions of the second edge guide may preferably but not necessarily be arranged in positions different in a tape-running direction from positions of the plurality of contact portions of the first edge guide. In one embodiment of this configuration, the contact portions of the edge guides are disposed at positions deviating from each other on one side edge and the other side edge. In such a servo writer, the tape inherent fluctuations are effectively restrained by the contact portions provided at positions deviating from each other on one side edge and the other side edge of the tape. Namely, the contact portion positions are different from each other between one side edge and the other side edge of the tape, so that the contact portions do not act as nodes for fluctuations of the tape, and a servo writer which can minimize the possibility of a resonance phenomenon and the like of the tape and can record and reproduce servo signals with a higher degree of accuracy is obtained. Accordingly, a servo writer is obtained which does not cause variations in the running speed of a magnetic tape or the like, restrains fluctuations of the magnetic tape or the like in the tape width direction, and can record or reproduce servo signals with a high degree of accuracy.

In another aspect of the present invention, a servo writer for recording a servo signal on a running tape is provided, which comprises: a head for recording on or reading from the tape a servo signal; a supply reel for supplying the tape to the head; a take-up reel for taking up the tape; a first guide member provided upstream of the head; and a second guide member provided downstream of the head. The first and second guide members each comprise a surface guide provided to guide a surface of the running tape and a first edge guide including a plurality of contact portions to guide a first edge of the running tape. Among distances between adjacent contact portions of the plurality of contact portions of the first edge guide, at least one distance is different from another distance. In this servo writer, each of the first and second guide members may preferably but not necessarily further comprise a second edge guide including a plurality of contact portions to guide a second edge of the running tape. Preferably but not necessarily, among distances between adjacent contact portions of the plurality of contact portions of the second edge guide, at least one distance may be different from another distance. Among the distances between adjacent contact portions of the plurality of contact portions of the second edge guide, preferably but not necessarily, all distances may be different from one another. Among pairs of adjacent contact portions of the plurality of contact portions of the second edge guide, preferably but not necessarily, a pair located nearer to the head than other pairs may be separated with a shorter distance put between adjacent contact portions thereof than the other pairs. The plurality of contact portions of the second edge guide may preferably but not necessarily be arranged in positions different in a tape-running direction from positions of the plurality of contact portions of the first edge guide.

In still another aspect of the present invention, there is provided a tape guide for guiding a running tape in a servo writer. The tape guide comprises a guide member to be fixed near a head for recording on or reading from the tape a servo signal. The guide member includes a surface guide provided to guide a surface of the running tape and an edge guide includes a plurality of contact portions to guide an edge of the running tape. Among distances between adjacent contact portions of the plurality of contact portions, at least one distance is different from another distance.

In still another aspect of the present invention, there is provided a tape guide assembly for guiding a running tape in a servo writer. The tape guide assembly comprises a guide member to be fixed near a head a head for recording on or reading from the tape a servo signal. The guide member includes a surface guide, a first edge guide and a second edge guide. The surface guide is provided to guide a surface of the running tape, and the first edge guide includes a plurality of contact portions to guide a first edge of the running tape. The second edge guide includes a plurality of contact portions to guide a second edge of the running tape. Among distances between adjacent contact portions of the plurality of contact portions of at least one of the first and second edge guides, at least one distance is different from another distance.

BRIEF DESCRIPTION OF THE DRAWINGS

The various aspects, advantages and further features of the present invention will become more apparent by describing in detail illustrative, non-limiting embodiments thereof with reference to the accompanying drawings, in which:

FIGS. 5A and 5B are schematic views illustrating the effects of restraining fluctuations in the servo writer according to an embodiment of the invention, wherein FIG. 5A illustrates the case where the edge of the magnetic tape waves in fine cycles, and FIG. 5B illustrates the case where the same edge waves in rough cycles;

FIGS. 6A and 6B illustrate comparative examples, wherein FIG. 6A illustrates the case where the edge of the magnetic tape waves in fine cycles, and FIG. 6B illustrates the case where the same edge waves in rough cycles;

FIG. 7 is a plan view (partially omitted) illustrating a modified example;

DETAILED DESCRIPTION OF THE EXEMPLARY EMBODIMENTS

Hereinafter, the servo writer relating to several exemplary embodiment of the present invention is described in detail with reference to the drawings.

Figure 1:
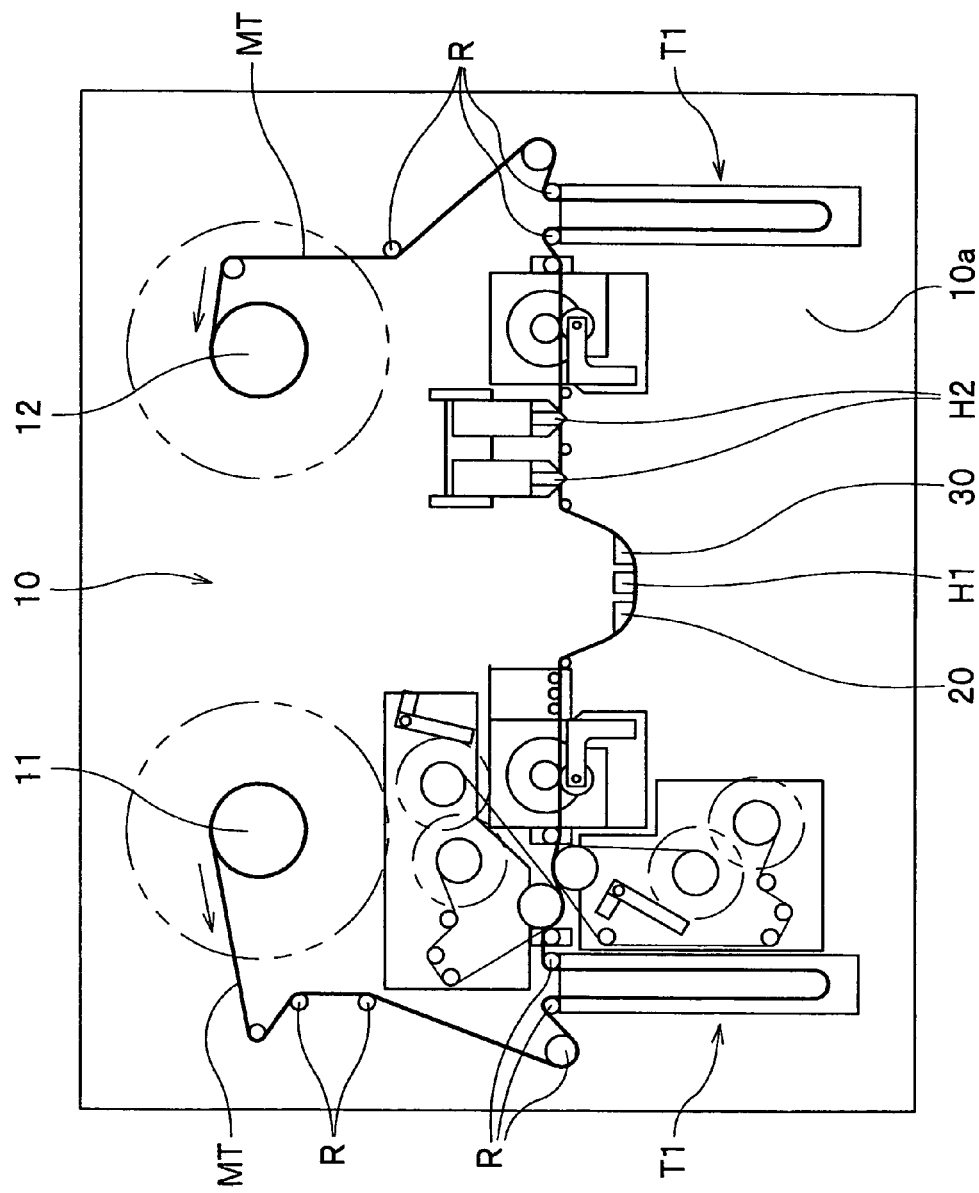
FIG. 1 is a constitutional view conceptually illustrating a servo writer according to an embodiment of the invention.

First, the entire constitution of a servo writer 10 according to one exemplified embodiment of the present invention is described with reference to FIG. 1. The servo writer 10 is provided with components described later on a panel 10a, and mainly comprises a supply reel 11 for sending out a magnetic tape MT, a take-up reel 12 for rewinding the magnetic tape MT from the supply reel 11, and a servo write head H1 (hereinafter, abbreviated to head H1) disposed on the downstream side of the supply reel 11 and on the upstream side of the take-up reel 12. The head H1 writes servo signals with a slanting servo pattern that is not shown on the magnetic tape MT.

On the upstream side and the downstream side of the head H1, guide members 20 and 30 for running the magnetic tape MT along the head H1 are provided. A verify head H2 for inspecting the servo signal written by the head H1 is provided between the guide member 30 on the downstream side and the take-up reel 12. The servo writer 10 is provided with various devices such as guides R for guiding the running of the magnetic tape MT in addition to a tension adjusting device T1 for adjusting the tension of the magnetic tape MT as predetermined and a tension inspection device (not shown).

In such a servo writer 10, the magnetic tape MT sent out of the supply reel 11 runs along a predetermined course by the rotation of a capstan roller while being guided by the guides R, and rewound by the take-up reel 12 through recording of servo signals by the head H1 and reproduction of the servo signals by the verify head H2.

Next, the structure and arrangement around the head H1 are described in detail with reference to FIG. 2.

The guide members 20 and 30 are disposed, as described above, on the upstream side and the downstream side along the running of the magnetic tape MT so as to sandwich the head H1, and attached onto a base 13 together with the head H1. The guide members 20 and 30 are provided with flange parts 21 and 31, sliding blocks provided on the upper parts of the flange parts 21 and 31, and guiding devices 23 and 33 provided at the upper parts of the sliding blocks 22 and 32, respectively.

Figure 3:
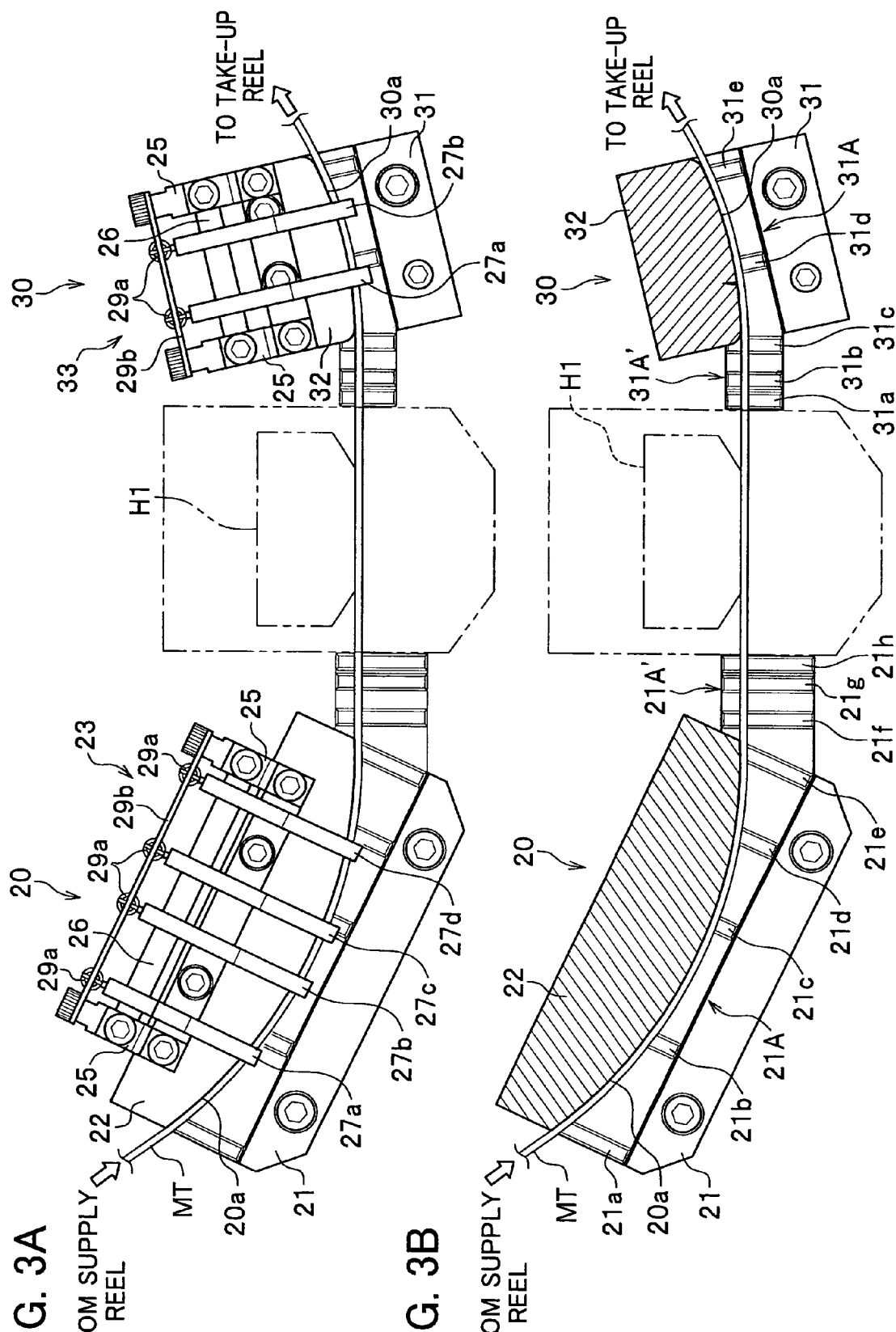
FIG. 3A is a plan view (partially omitted) illustrating the entire constitution around the head of the same.
FIG. 3B is a plan sectional view (partially omitted) illustrating the entire constitution around the head of the same.

The flange parts 21 and 31 are provided with edge guides 21A and 31A, respectively, that guide one side (lower side) of the edge of the magnetic tape MT. As shown in FIG. 3B, the edge guide 21A on the upstream side has eight contact portions 21a through 21h formed into projecting strips, and among these, the contact portions 21a through 21e are provided on the flange part 21, and the contact portions 21f through 21h are provided on the edge guide 21A' extended toward the head H1 from the flange part 21. On the other hand, the edge guide 31A on the downstream side has five contact portions 31a through 31e formed into projecting strips, and among these, the contact portions 31a through 31c are provided on the edge guide 31A' extended from the flange part 31 toward the head H1, and the contact portions 31d and 31e are provided on the flange part 31.

In this embodiment, the contact portions 21a through 21h and 31a through 31e of the edge guides 21A and 31A are disposed so that intervals between these are all uneven in the running direction of the magnetic tape MT. Namely, the interval between the contact portions adjacent to each other, that is, for example, the intervals between the contact portions 21a and 21b and the contact portions 21b and 21c are different from each other, and the intervals between the contact portions spaced from each other, that is, for example, the interval of the combination of the contact portions 21f and 21h is different from the intervals of other adjacent contact portions (reference numerals omitted) and the intervals of other combinations of the contact portions (reference numerals omitted). Namely, the intervals between the points at which the magnetic tape MT extend across the contact portions 21a through 21h and 31a through 31e are set unevenly.

Furthermore, the guide portions 21A and 31A are both formed so that the intervals of the adjacent contact portions (for example, the contact portions 21a and 21b and the contact portions 21b and 21c) gradually become smaller toward the head H1. Namely, in the edge guide 21A, the interval between the contact portions 21a and 21b on the most upstream side becomes largest, and the interval gradually becomes smaller toward the head H1 on the downstream side, and the interval between the contact portions 21g and 21h on the most downstream side closest to the head H1 becomes smallest. In the edge guide 31A, the interval between the contact portions 31a and 31b on the most upstream side closest to the head H1 is set to be smallest, and the interval gradually becomes larger as it moves apart from the head H1 toward the downstream side.

Figure 4:
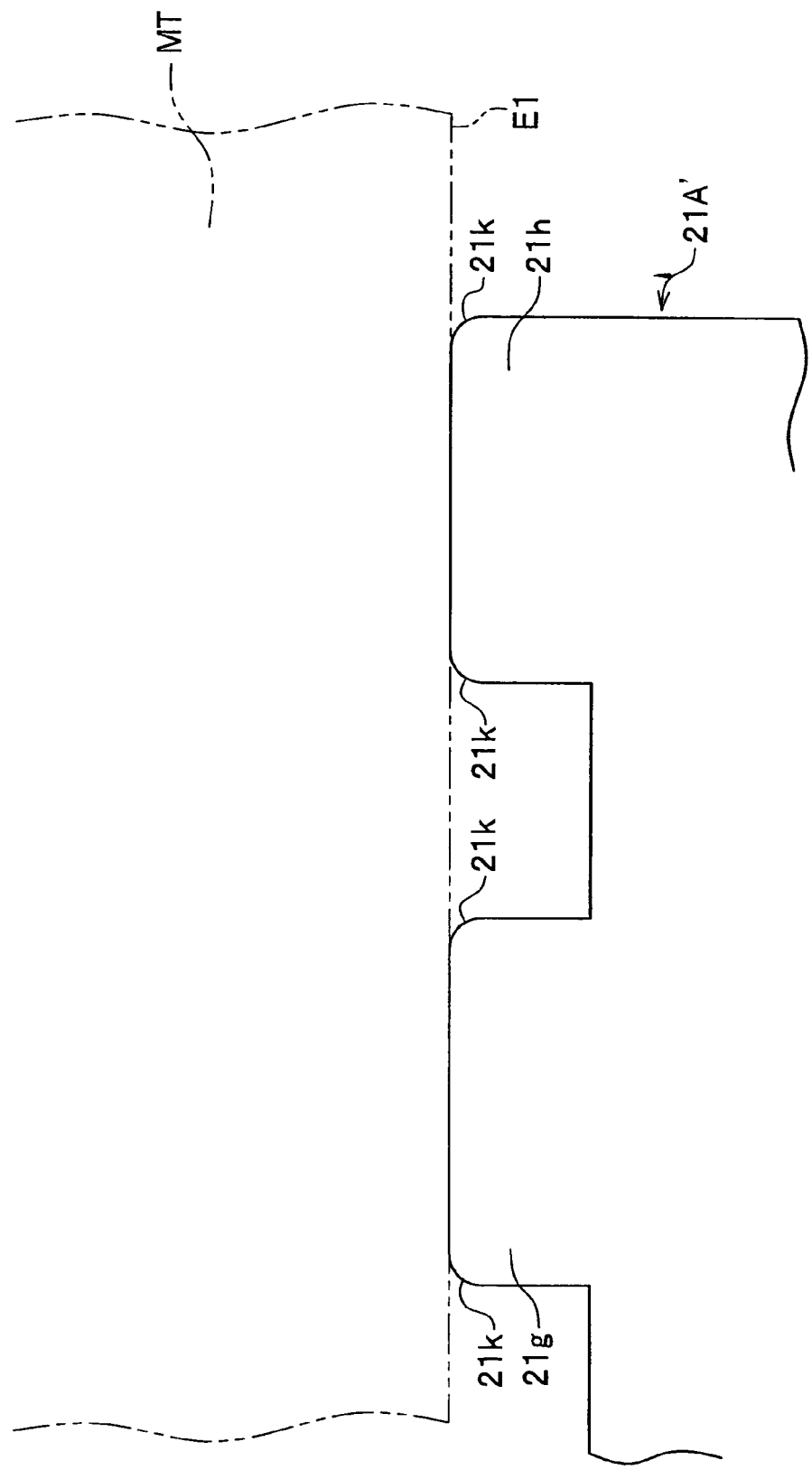
FIG. 4 is a partially enlarged front view for describing the forms of the contact portions.

Such edge guides 21A and 31A can be made of a nonmagnetic material that is small in sliding resistance and excellent in wearing resistance, for example, ceramic such as zirconia. The contact portions 21a through 21h and 31a through 31e are formed to have rounded corners 21k as shown by the enlarged part of FIG. 4. Thereby, smooth running is realized without catching of the edge E1 when the magnetic tape MT runs. The intervals between the contact portions 21a though 21h and 31a through 31e thus made uneven can be set by a method using prime numbers or other method.

As shown in FIG. 3B, the contact portions 21a through 21h and 31a through 31e of the edge guides 21A and 31A are disposed so that the intervals between these are all uneven in the running direction of the magnetic tape MT, however, the invention is not limited to this, and it is also allowed that the intervals are at least partially uneven. In this case, it is desirable that the intervals of at least four or more, more preferably, five or more combinations of the contact portions (reference numerals omitted) are all made uneven. By increasing the combinations of the contact portions set uneven, more stable tape running is realized.

Figure 2:
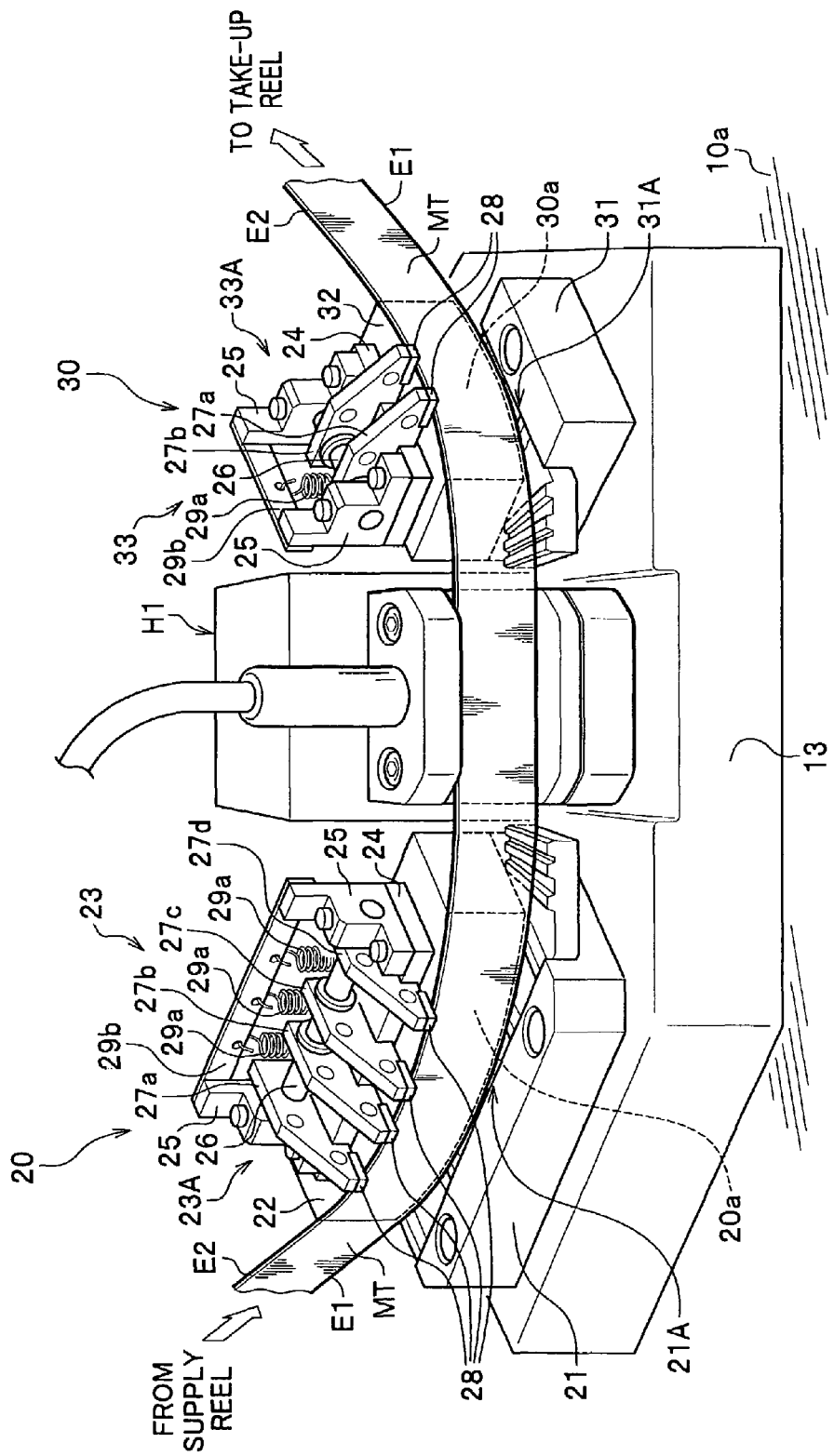
FIG. 2 is a perspective view illustrating the entire constitution around the head of the same.

The sliding blocks 22 and 32 have sliding surfaces (surface guides) 20a and 30a, respectively, along the running direction of the magnetic tape MT as shown in FIG. 2, and these sliding surfaces 20a and 30a are formed so as to have almost the same width as that of the magnetic tape MT, and formed into arcs to make sliding of the recording/reproducing surface of the magnetic tape MT smooth (see FIG. 3A and FIG. 3B). In these sliding surfaces 20a and 30a, a plurality of air blowoff openings are formed, and the magnetic tape MT running along the sliding surfaces 20a and 30a slightly float from the sliding surfaces 20a and 30a due to high pressure air blown from the air blowoff openings.

Guiding devices 23 and 33 comprise edge guides 23A and 33A for guiding the edge E2 on the other side (upper side) of the magnetic tape MT. The guiding devices 23 and 33 basically have the same constitution, so that one guiding device 23 is described herein. The guiding device 23 has a base part 24 fixed to the upper surface of a sliding block 22, side parts 25 and 25 erected on the left and right upper surfaces of the base part 24, a shaft 26 laid across the side parts 25 and 25, and four arms 27a through 27d (arms 27a and 27b in the guiding device 33, the same applies to the description given below) rotatably supported by the shaft 26, and on the front ends of the arms 27a through 27d, contactors 28 that can press the edge E2 of the magnetic tape MT and are excellent in slidability are provided. For the contactors 28, the material used for the edge guides 21A and 31A, for example, ceramic such as zirconia can be used.

The arms 27a through 27d of such an edge guide 23A are connected on their rear ends to a spring arm 29b laid across the upper parts of the side parts 25 and 25 via drawing springs 29a. Thereby, the arms 27a through 27d rotate around the shaft 26, and the contactors 28 on the front ends are urged so as to press the edge E2 of the magnetic tape MT.

Thereby, the magnetic tape MT runs in a state where the edges E1 and E2 are guided from above and below by the edge guides 21A and 31A and the edge guides 23A and 33A.

In this embodiment, as shown in FIG. 3A, the interval between the arms 27a and 27b and the interval between the arms 27c and 27d are set to be almost equal to each other. In addition, the interval between the arms 27b and 27c is set to be smaller than the above-mentioned interval. Furthermore, the arms 27a through 27d and the contact portions 21a through 21h and 31a through 31e of the edge guides 21A and 31A (see FIG. 3B) are disposed at positions deviating from each other in a plan view (see FIG. 3A).

FIGS. 5 are schematic diagrams showing the restraining effect on fluctuations in the servo writer 10 of this embodiment, wherein FIG. 5A is a diagram showing a case where the edge waves in fine (small) cycles in the magnetic tape MT, and FIG. 5B is a diagram showing a case where the edge waves in rough (large) cycles. Herein, the tape positions A and C shown by the solid lines in the diagrams show one condition that developed, and the tape positions B and D shown by the dashed lines in the diagrams schematically show a condition where the magnetic tape MT is closest to the edge guides 21A and 31A with respect to the tape positions A and C shown by the solid lines. In the diagrams, the contact portions 21c through 21h close to the head H1 of the edge guide 21A are schematically shown.

As shown in FIG. 5A, at the tape position A at which the edge waves in small cycles, the magnetic tape MT is guided in contact (sliding) with the contact portions 21c, 21d, 21f, and 21h at the plurality of points (1) through (4). On the other hand, at the tape position B, the magnetic tape MT is guided in contact (sliding) with the contact portions 21e, 21f, 21g, and 21h at a plurality of points (1)' through (4)'. The difference Y1 (amplitude) between the tape position A and the tape position B in this case rarely occurred. Therefore, the inherent fluctuations of the magnetic tape MT caused during running of the magnetic tape MT are restrained by guidance by some of the contact portions 21c through 21h, whereby highly stable running of the magnetic tape MT is realized without the resonance phenomenon with respect to the inherent fluctuations of the magnetic tape MT.

In addition, as shown in FIG. 5B, at the tape position C at which the edge waves in rough cycles, at a plurality of points (1) and (2), the magnetic tape MT is guided in contact (sliding) with the contact portions 21c and 21f. On the other hand, at the tape position D, at the point (1)', the magnetic tape MT is guided in contact (sliding) with the contact portion 21g. In this case, there is a slight difference (amplitude) Y2 between the tape position C and the tape position D, however, the difference is significantly improved in comparison with the comparative example (see FIG. 6B) described later.

Figure 6A:
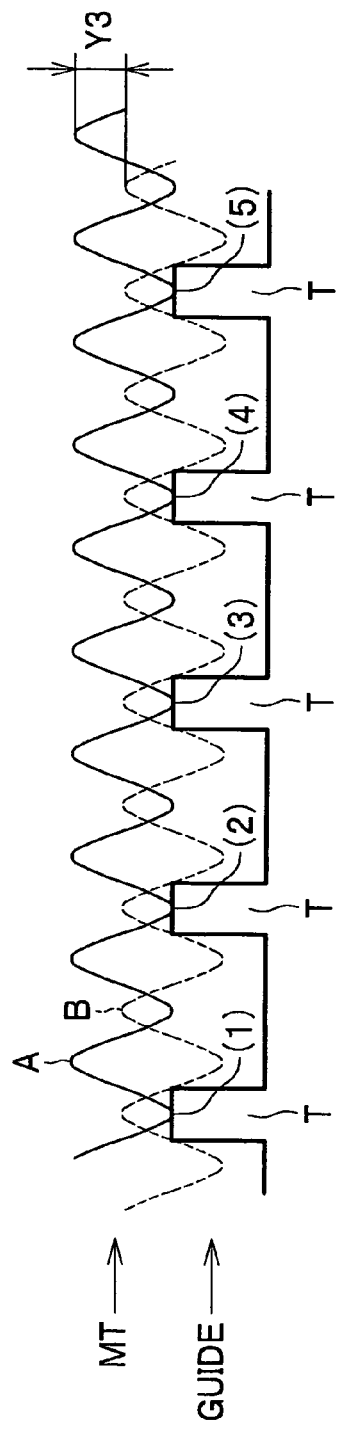
Figure 6B:
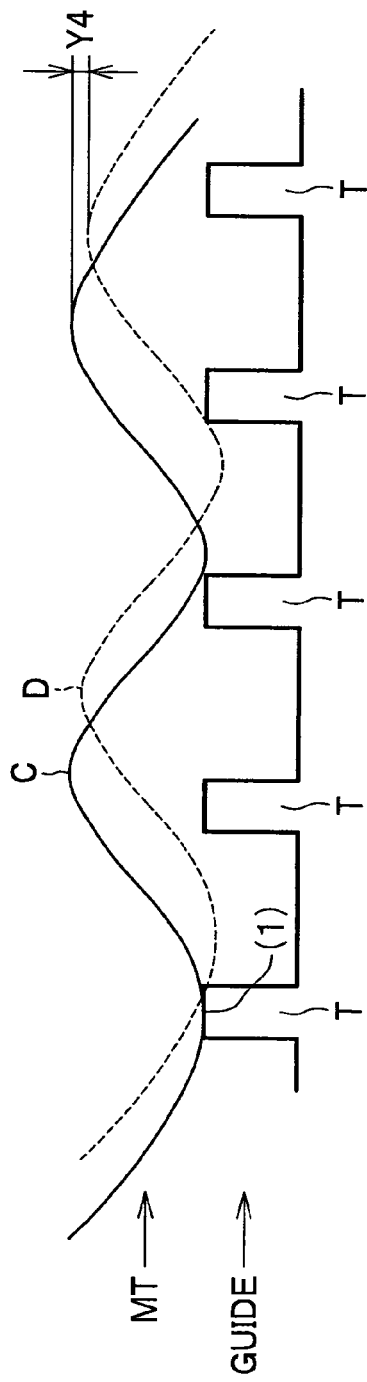

As a comparative example, in FIG. 6A and FIG. 6B, an example is shown in which an edge guide including contact portions T at constant intervals is provided. FIG. 6A shows a case where the edge of the magnetic tape MT waves in fine (small) cycles, and FIG. 6B shows a case where the edge waves in rough (large) cycles. Herein, the tape positions A and C shown by the solid lines in the figures show one condition that developed, and the tape positions B and D shown by dashed lines in the figures schematically show the condition where the magnetic tape MT is closest to the edge guide with respect to the tape positions A and C shown by the solid lines.

As shown in FIG. 6A, at the tape position A at which the edge waves in fine cycles, at all points (1) through (5), the magnetic tape MT is guided in contact (sliding) with the contact portions T. On the other hand, at the tape position B, the magnetic tape MT runs while deviating from the contact portions T. The difference (amplitude) Y3 between the tape position A and the tape position B in this case is extremely great in comparison with the example of FIG. 5A described above. Therefore, the example shown in FIG. 6A is disadvantageous in that running becomes stable only at the very limited position A or a tape position in a phase close to the position A and running becomes unstable at other positions.

In addition, as shown in FIG. 6B, at the tape position C at which the edge waves in rough cycles, at the point (1), the magnetic tape MT is guided in contact (sliding) with the contact portions T. On the other hand, at the tape position D, the magnetic tape MT runs while deviating from the contact portions T. The difference (amplitude) Y4 between the tape position C and the tape position D in this case becomes great. Therefore, the example shown in FIG. 6B is disadvantageous in that running becomes stable at only the very limited specific tape position C or tape position in a phase close to the position C and running becomes unstable at other positions. Therefore, comparing this example and the example of FIG. 5B, fluctuations of the magnetic tape MT are more effectively restrained in the example shown in FIG. 5B.

Namely, by using the servo writer 10 of this embodiment, even if the magnetic tape MT inherently fluctuates during running, the fluctuations are restrained by the presence of the contact portions 21a through 21h and 31a through 31e disposed at uneven intervals, whereby highly stable running of the magnetic tape MT is realized without the resonance phenomenon or the like with respect to the inherent fluctuations of the magnetic tape MT.

According to the servo writer 10 of this embodiment described above (hereinafter, refer to each figure), the edge guides 21A and 31A of the guide members 20 and 30 are provided with the plurality of contact portions 21a through 21h and 31a through 31e all intervals of which are made uneven, so that the magnetic tape MT runs while its one side edge E1 is guided by the plurality of contact portions 21a through 21h and 31a through 31e. Therefore, the sliding areas between the edge guides 21A and 31A and the edge E1 of the magnetic tape MT can be reduced, and causes of wearing and running speed unevenness during running of the magnetic tape MT can be reduced. Thereby, highly stable running of the magnetic tape MT is realized.

In addition, the intervals between the contact portions 21a through 21h and 31a through 31e of the edge guides 21A and 31A are all set unevenly, so that the magnetic tape MT is guided by the contact portions 21a through 21h and 31a through 31e disposed at uneven intervals. Namely, inherent fluctuations in the tape width direction of the magnetic tape MT occurring during running of the magnetic tape MT are restrained by guidance by some of the contact portions 21a through 21h and 31a through 31e, whereby highly stable running is realized without the resonance phenomenon or the like with respect to the inherent fluctuations of the magnetic tape MT.

Therefore, a servo writer 10 which can record or reproduce servo signals with a high degree of accuracy is obtained.

The guide portions 21A and 31A are formed so that the intervals of the contact portions adjacent to each other (for example, the contact portions 21a and 21b and the contact portions 21b and 21c) become smaller toward the head H1, and this is advantageous in that it becomes easier to restrain the inherent fluctuations of the magnetic tape MT toward the head H1.

Furthermore, the magnetic tape MT is guided on its one side edge E1 by the edge guides 21A and 31A and guided on the other side edge E2 by the edge guides 23A and 33A of the guiding devices 23 and 33, so that inherent fluctuations of the magnetic tape MT are compositely restrained by the edge guides 21A and 31A and the edge guides 23A and 33A provided on both edges E1 and E2 of the magnetic tape MT. Thereby, highly stable running is realized without the resonance phenomenon or the like with respect to the inherent fluctuations of the magnetic tape MT.

Therefore, a servo writer 10 which can record or reproduce servo signals with a high degree of accuracy is obtained.

In addition, the arms 27a through 27d of the edge guides 23A and 33A of the guiding devices 23 and 33 and the contact portions 21a through 21h and 31a through 31e of the edge guides 21A and 31A are disposed so as to deviate from each other in a plan view (in the running direction of the magnetic tape MT), so that inherent fluctuations of the magnetic tape MT are effectively restrained on both edges E1 and E2 of the magnetic tape MT. Namely, between the edges E1 and E2 of the magnetic tape MT, the positions of the contact portions 21a through 21h and 31a through 31e and the positions of the arms 27a through 27d are different from each other, so that the contact portions 21a through 21h and 31a through 31e do not act as nodes for the fluctuations of the magnetic tape MT, and a servo writer 10 which minimizes the possibility of the resonance phenomenon or the like of the magnetic tape MT, and can record and reproduce servo signals with a higher degree of accuracy, is obtained.

The embodiment of the invention is described above, however, as a matter of course, the invention is not limited thereto and the invention can be altered as appropriate in accordance with the gist of the invention. For example, it is allowed that, as shown in FIG. 7, the arms 27a through 27d of the edge guide 23A of the guiding device 23 are disposed so that the intervals between adjacent arms (for example, the arms 27a and 27b and the arms 27b and 27c) become smaller toward the head H1. This constitution provides an advantage in that it becomes easier to restrain inherent fluctuations of the magnetic tape MT toward the head H1. It is also allowed that the arms 27a and 27b of the edge guide 33A of the guiding device 33 are disposed so that their intervals become smaller.

Figure 8:
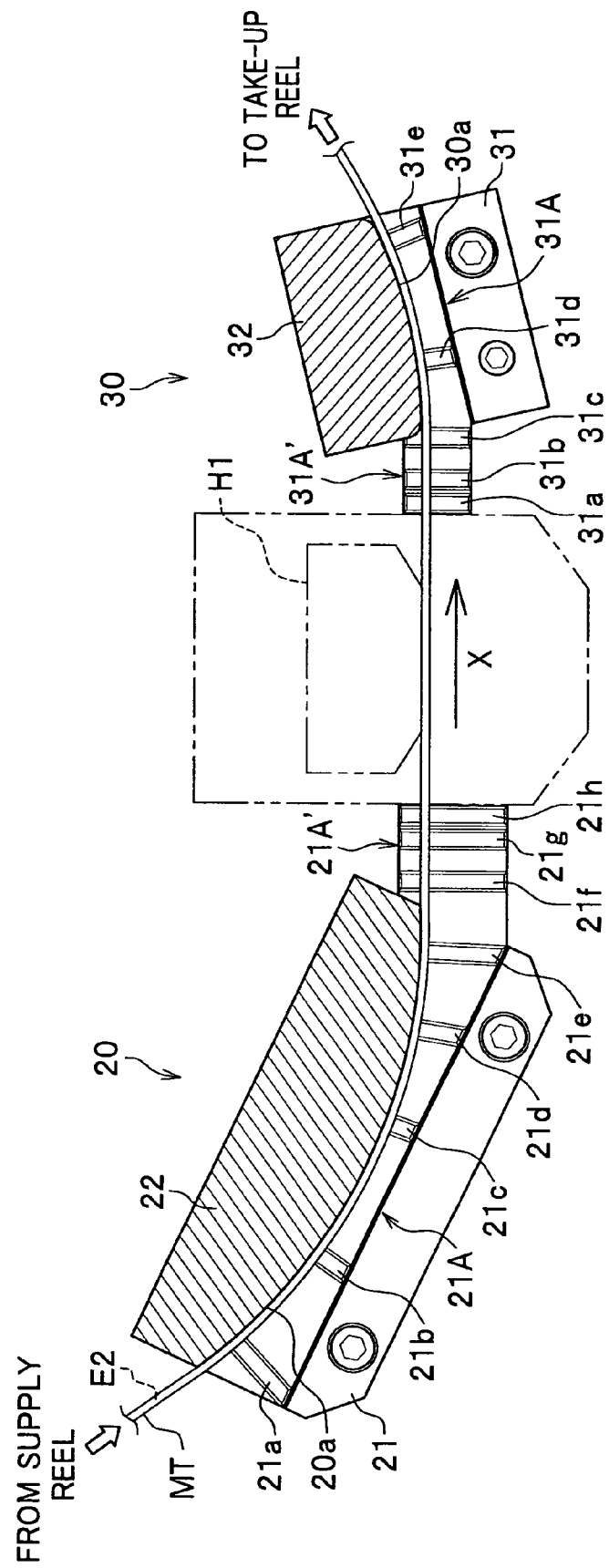
FIG. 8 is a plan sectional view (partially omitted) illustrating a modified example.
Figure 9:
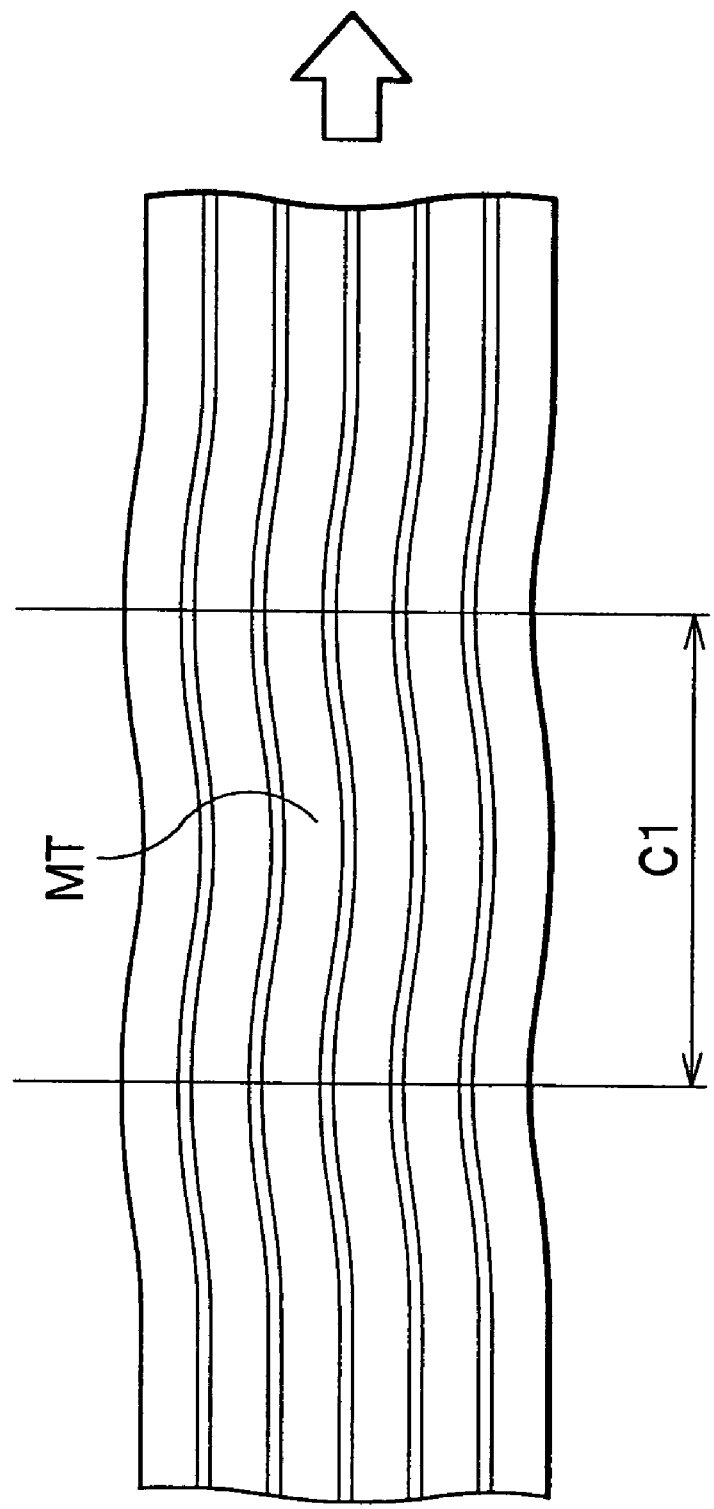
FIG. 9 is a schematic view showing fluctuations in the tape width direction of the magnetic tape.

In addition, as shown in FIG. 8, it is also allowed that the contact portions 21a through 21h and 31a through 31e of the edge guides 21A and 31A are provided in the direction crossing the running direction X of the magnetic tape MT at right angles. With this constitution, the edge E1 of the running magnetic tape MT and the contact portions 21a through 21h and 31a through 31e are always in contact in the direction crossing at right angles, resulting in more stable running than in the case where the edge E1 of the magnetic tape MT and the contact portions 21a through 21h and 31a through 31e are in contact while inclining from the direction crossing at right angles (see FIG. 3B). Therefore, a servo writer 10 (see FIG. 1) that can record or reproduce servo signals with a higher degree of accuracy (see FIG. 1) is obtained.

In the above-mentioned embodiment, the head H1 side is described, however, it is also possible that the verify head H2 side is constituted in the same manner.

What is claimed is:

1. A servo writer for recording a servo signal on a running tape, comprising:
a head; and
a guide member provided near the head, the guide member comprising a surface guide provided to guide a surface of the running tape and a first edge guide including a plurality of contact portions to guide a first edge of the running tape,
wherein among distances between adjacent contact portions of the plurality of contact portions of the first edge guide, at least one distance is different from another distance,
wherein the guide member further comprises a second edge guide including a plurality of contact portions to guide a second edge of the running tape, and
wherein the plurality of contact portions of the second edge guide are arranged in positions different in a tape-running direction from positions of the plurality of contact portions of the first edge guide.

2. A servo writer according to claim 1, wherein the head comprises a write head.

3. A servo writer according to claim 1, wherein the head comprises a read head.

4. A servo writer according to claim 1, wherein among the distances between adjacent contact portions of the plurality of contact portions of the first edge guide, all distances are different from one another.

5. A servo writer according to claim 1, wherein among pairs of adjacent contact portions of the plurality of contact portions of the first edge guide, a pair located nearer to the head than other pairs is separated with a shorter distance put between adjacent contact portions thereof than the other pairs.

6. A servo writer according to claim 1, wherein the plurality of contact portions of the first edge guide are each shaped like a strip laid substantially perpendicular to the surface of the running tape.

7. A servo writer according to claim 1, wherein among distances between adjacent contact portions of the plurality of contact portions of the second edge guide, at least one distance is different from another distance.

8. A servo writer according to claim 1, wherein among the distances between adjacent contact portions of the plurality of contact portions of the second edge guide, all distances are different from one another.

9. A servo writer according to claim 1, wherein among pairs of adjacent contact portions of the plurality of contact portions of the second edge guide, a pair located nearer to the head than other pairs is separated with a shorter distance put between adjacent contact portions thereof than the other pairs.

10. A servo writer according to claim 1, wherein the plurality of contact portions of at least one of the first and second edge guides are each shaped like a strip laid substantially perpendicular to surface of the running tape.

11. A servo writer according to claim 1, wherein the contact portions of the first edge guide are provided in the direction crossing the running direction of the running tape at right angles.

12. A servo writer for recording a servo signal on a running tape, comprising:
- a head for recording on or reading from the tape a servo signal;
- a supply reel for supplying the tape to the head;
- a take-up reel for taking up the tape;
- a first guide member provided upstream of the head; and
- a second guide member provided downstream of the head;
- wherein the first and second guide members each comprise a surface guide provided to guide a surface of the running tape and a first edge guide including a plurality of contact portions to guide a first edge of the running tape;
- wherein among distances between adjacent contact portions of the plurality of contact portions of the first edge guide, at least one distance is different from another distance,
- wherein each of the first and second guide members further comprises a second edge guide including a plurality of contact portions to guide a second edge of the running tape, and
- wherein the plurality of contact portions of the second edge guide are arranged in positions different in a tape-running direction from positions of the plurality of contact portions of the first edge guide.

13. A servo writer according to claim 12, wherein among distances between adjacent contact portions of the plurality of contact portions of the second edge guide, at least one distance is different from another distance.

14. A servo writer according to claim 12, wherein among the distances between adjacent contact portions of the plurality of contact portions of the second edge guide, all distances are different from one another.

15. A servo writer according to claim 12, wherein among pairs of adjacent contact portions of the plurality of contact portions of the second edge guide, a pair located nearer to the head than other pairs is separated with a shorter distance put between adjacent contact portions thereof than the other pairs.

16. A tape guide for guiding a running tape in a servo writer, comprising a guide member to be fixed near a head for recording on or reading from the tape a servo signal, the guide member including a surface guide provided to guide a surface of the running tape and an edge guide including a plurality of contact portions to guide an edge of the running tape,
- wherein among distances between adjacent contact portions of the plurality of contact portions, at least one distance is different from another distance; and
- wherein the plurality of contact portions of the edge guide is fixed in place.

17. A tape guide assembly for guiding a running tape in a servo writer, comprising a guide member to be fixed near a head a head for recording on or reading from the tape a servo signal, the guide member including a surface guide, a first edge guide and a second edge guide, the surface guide provided to guide a surface of the running tape, the first edge guide including a plurality of contact portions to guide a first edge of the running tape, the second edge guide including a plurality of contact portions to guide a second edge of the running tape,
- wherein among distances between adjacent contact portions of the plurality of contact portions of at least one of the first and second edge guides, at least one distance is different from another distance; and
- wherein the plurality of contact portions of at least one of the first and second edge guides is fixed in place.

* * * * *